G. L. SCHOFIELD.
AUTOTRACTOR.
APPLICATION FILED MAR. 8, 1917.
1,356,473.
Patented Oct. 19, 1920.
3 SHEETS—SHEET 1.
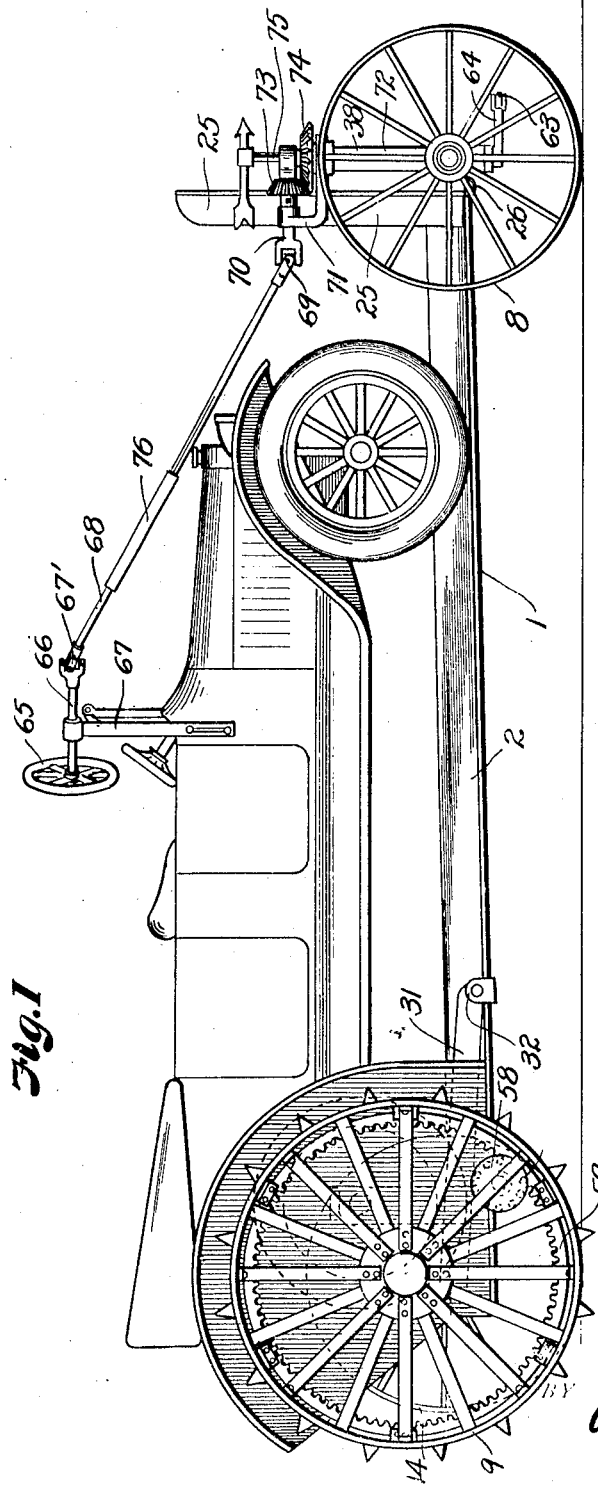
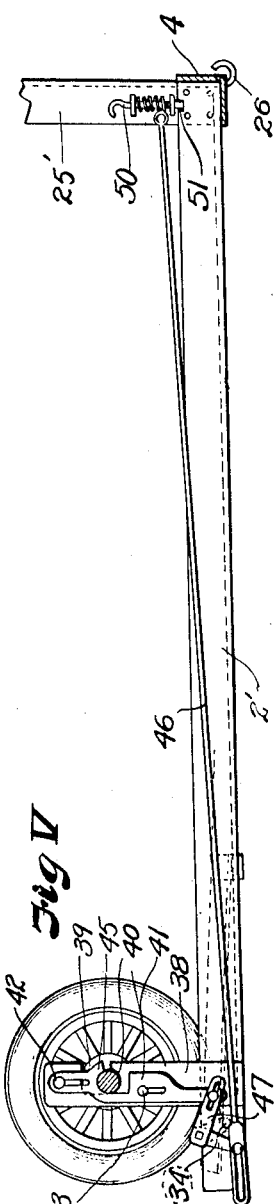
INVENTOR.
George L. Schofield.
BY Arthur C. Brown,
ATTORNEY

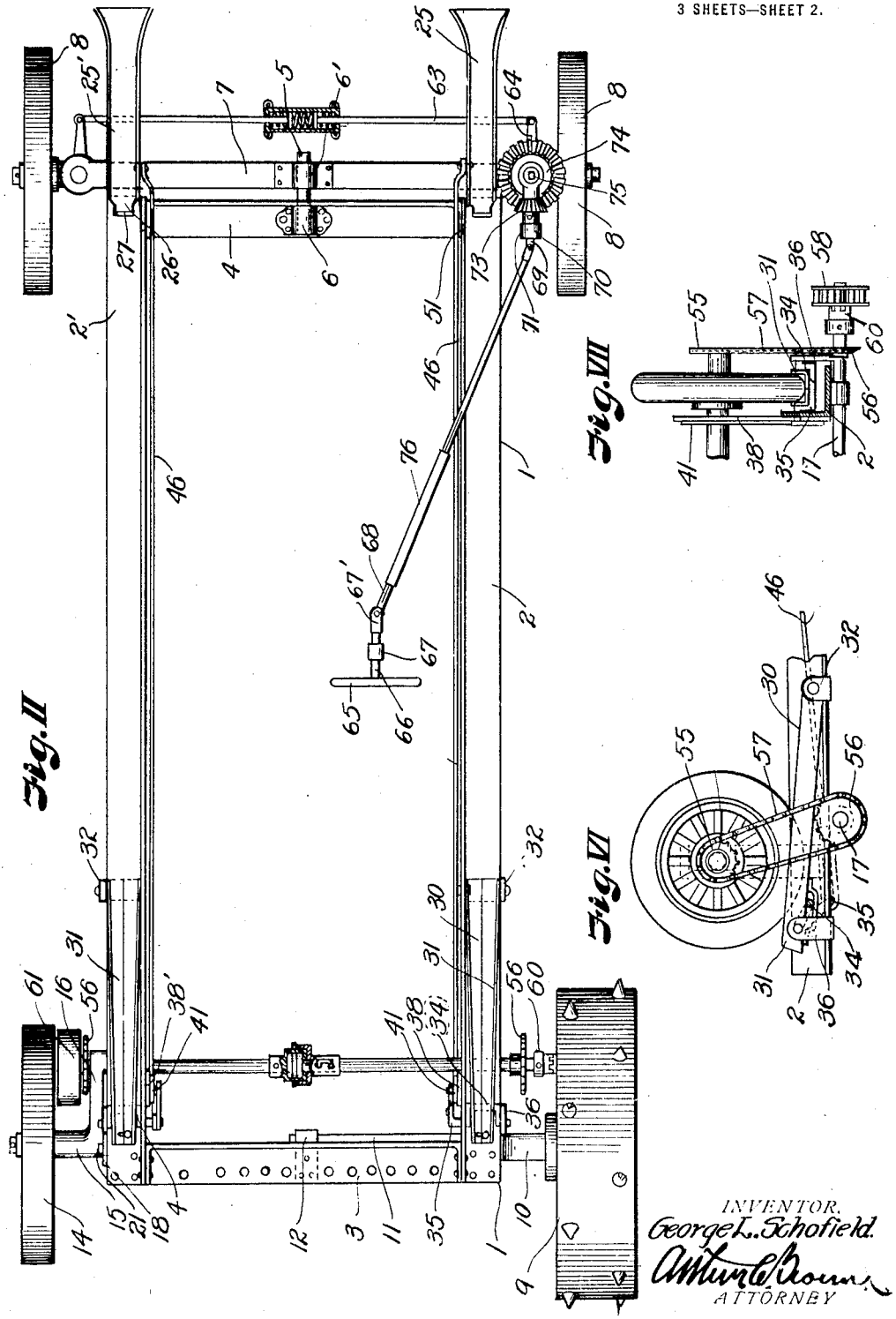

G. L. SCHOFIELD.
AUTOTRACTOR.
APPLICATION FILED MAR. 8, 1917.
1,356,473.
Patented Oct. 19, 1920.
3 SHEETS—SHEET 3.
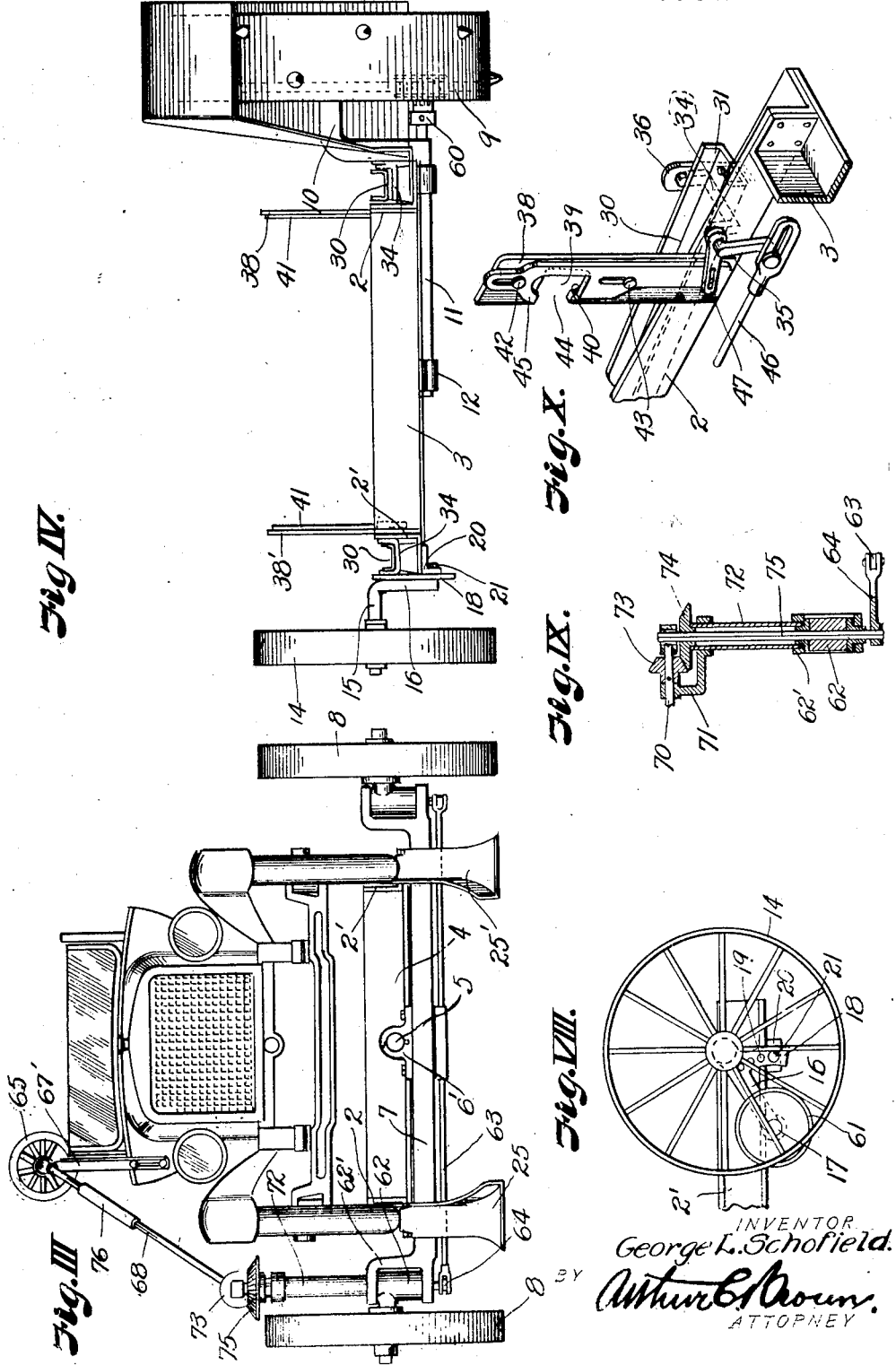

UNITED STATES PATENT OFFICE.

GEORGE L. SCHOFIELD, OF KANSAS CITY, MISSOURI, ASSIGNOR, BY MESNE ASSIGN-
MENTS, TO AUTOMOTIVE TRACTOR CORPORATION OF AMERICA, OF KANSAS CITY,
MISSOURI, A CORPORATION OF MISSOURI.

AUTOTRACTOR.

1,356,473.     Specification of Letters Patent.     Patented Oct. 19, 1920.

Application filed March 8, 1917. Serial No. 153,289.

*To all whom it may concern:*

Be it known that I, GEORGE L. SCHOFIELD, a citizen of the United States, residing at Kansas City, in the county of Jackson and State of Missouri, have invented certain new and useful Improvements in Auto-tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to auto-tractors and has for its principal object to provide a carrier or tractor frame whereon an automobile or other motor vehicle may be mounted easily and quickly and so connected with driving parts of the carrier that a tractor is provided which may be used to perform the work of the usual tractor, wherein the power of propelling mechanism is permanently located on the carrying frame.

It is also an object of the invention to provide means for centering and for securing the motor vehicle on the carrier frame in functional position and means for steering the carrier from the seat of the motor vehicle.

A further object of the invention is to provide means for leveling the carrier frame when the latter is being used on sloping ground or when one of the ground wheels is required to travel in a plowed furrow.

In accomplishing these objects, I have provided improved details of structure the preferred forms of which are illustrated in the accompanying drawings, wherein—

Figure I is a side elevation of an auto-tractor constructed according to the present invention.

Fig. II is a plan view of the carrier frame.

Fig. III is a front view of the carrier showing a motor vehicle mounted thereon.

Fig. IV is a rear view of the same.

Fig. V is a side view of a portion of the carrier frame illustrating the means for locking the axle of the motor vehicle in functional position.

Fig. VI is a side elevation of a portion of the carrier frame illustrating the operation of the centering runways and the driving connection of the automobile with the carrier gearing.

Fig. VII is an end view of the same parts.

Fig. VIII is a side view illustrating the mounting and adjustment of the frame leveling wheel.

Fig. IX is a sectional view, illustrating the connection of the steering mechanism with the guide wheels.

Fig. X is a detail perspective view of the locking mechanism for securing the driving vehicle in functional position on the carrier frame.

Referring more in detail to the drawings:

1 designates the frame of a carrier, or auto-tractor, constructed according to my invention, comprising a pair of parallel runways 2—2' that are rigidly joined in spaced relation at their rearward and forward ends by cross beams 3—4. The side and end frame members are preferably of angle iron construction and the runways are spaced to conveniently receive a vehicle of standard road gage.

The frame is pivotally supported at its forward end by means of a pin 5 which extends horizontally through a bearing 6, mounted centrally on the cross beam 4 and a bearing 6' on a transverse axle 7 which is supported at its opposite ends by the guide wheels 8. At its rearward end the frame is supported at one side by means of a drive or bull wheel 9, carried on a drop axle 10, having a portion 11 extended beneath the frame beam 3 and secured thereto by bearing plates 12, and at its opposite side by an adjusting wheel 14, mounted on the offset portion 15 of an axle arm 16 that is pivotally mounted on a shaft 17 located transversely beneath the carrier frame.

Means for securing the adjusting wheel in position to effect leveling of the frame, comprises an arcuate extension 18 on the arm 16 that is provided with a plurality of apertures 19 adapted to register with apertures in a plate 20, secured to the under face of the runway beam 2', so that when the wheel is adjusted vertically as desired, it may be secured in such position by inserting a bolt 21 through the registering apertures in the extension 18 and plate 20. With this wheel adjustment, and with the pivotal support at the front end of the frame, the latter may be quickly leveled when used on sloping surfaces or when it is required that one of the rear wheels travel in a plowed furrow.

In order to mount or remove the motor vehicle from the tractor frame, I provide runway extensions 25—25' which are pivotally attached at the forward ends of the runways 2—2' by means of looped portions 26, formed at the ends of the extensions which extend through slots 27 in the bases of the forward ends of the runways 2—2', so that the extensions may be raised or lowered to provide an inclined track whereby the motor vehicle may reach or leave the runways. The runway extensions are preferably of channel iron construction and are flared at their free ends to facilitate the guiding of the motor vehicle onto the carrier.

In order to properly locate the driving vehicle on the frame and to secure the same solidly in functional position, I have provided centering guideways 30 at opposite sides and near the rear ends of the runways 2—2', each comprising paired angle iron members 31 pivotally mounted at their forward ends on brackets 32 secured to the runways, and supported at their rearward ends in an upwardy inclined position on the cross bars 34 of bell crank levers 35 that are carried by the inner walls of and by brackets 36 secured to the bases of the runways 2—2'.

Secured at opposite sides of the frame to the vertical portions of the runways 2—2', are standards 38—38', each provided with a forwardly opening socket 39, which is so located that it will receive the axle of the motor vehicle as the latter is moved rearwardly on the frame and up the centering guideways 30; the bases of the sockets being provided with seats 40 into which the vehicle axle may be lowered by a downward movement of the guide channels 30.

Means for securing the vehicle axle in the standard seats comprises locking plates 41 which are slidably carried on the inner faces of the standards 38—38' and are mounted at their opposite ends on pins 42—43, extending from the inner faces of the standards, each plate being provided with a forwardly opening socket 44 registering with the sockets 39 and with a depending hook 45 which is moved with the plate to close or open the entrance to the standard socket.

Means for rocking the bell crank levers 35 to lower the vehicle to seat the axle of the propelling vehicle in the standard socket seats 40 and for simultaneously moving the locking plates 41 to clamp the axle in its functional position, comprises rods 46 which are pivotally connected at their rear end with the crank levers 35 and at their forward ends to the pivotally mounted runway extensions 25—25'. Also extended from the crank lever 35, are levers 47 having pin and slot connection with the slide clamps 41, whereby rocking of the levers 35, will move the clamp plates toward or from the axle.

With the parts so constructed, the runways may be lowered to permit a vehicle to be backed onto the carrier frame along the guide ways and into the inclined centering channels 30, so that the rear axle of the vehicle is brought into the standard sockets 39. The runways 25—25' are then raised and through the link connecting rods 46, the bell crank bars are lowered to lower the tracks 30 and free the drive wheels and permit the vehicle axle to seat in the standard sockets and at the same time move the clamp plates 41 downwardly to lock the motor vehicle axle in the socket seats. When the runways 25—25' are moved to vertical position they are locked by means of spring pressed latch bars 50, carried on the pivotally mounted members, the ends of which are adapted to seat in notches 51 in the forward ends of the side beams 2—2', to not only support the runways off the ground, but through the rods 46, lock the clamping plates over the vehicle axle.

In order to drive the carrier from the vehicle, I mount sprocket wheels 55 on the hubs of the rear wheels of the motor vehicle and provide the transverse shaft 17 with similar sprocket wheels 56, and over the paired sprocket wheels I run chain belts 57 so that power may be transmitted from the vehicle to the shaft 17.

Revolubly mounted at the end of the shaft 17, is a gear wheel 58 which is adapted to mesh with a gear ring 59 fixed on the bull wheel 9, and at the end of the shaft 17 opposite the gear 58, I provide a pulley wheel 61 over which a belt may be run to drive a separator, saw, or other machine.

Slidably keyed on the shaft 17 adjacent the gear wheel 58 is a clutch 60 adapted to be moved into mesh with the clutch teeth on the gear 58 so that power may be transmitted through the shaft to move the vehicle drive wheel or out of gear to permit the shaft to revolve freely for other purposes.

The front guide wheels 8 are mounted on knuckles 62 pivotally carried in yoke arms 62' at the ends of the axle 7, and are held in relative guiding alinement by a cross bar 63 which connects the ends of the knuckle arms 64.

Means for steering the tractor from the vehicle seat comprises a steering wheel 65 that is mounted on a shaft 66 carried in a standard 67 that is removably mounted on the body of the propelling vehicle. Connected with the shaft 66, by a universal joint 67', is a rod 68 which extends forwardly and is connected, by a universal joint 69, with a shaft 70 that is carried in a bracket 71 secured on a tubular standard 72 that extends from a knuckle yoke 62'. Secured on the shaft 70 is a bevel gear wheel 73 which meshes with a horizontal bevel gear wheel 74 fixed on a squared shaft 75 that extends downwardly through the standard 72 and is fixed in the steering knuckle 62 so that turning of the steering wheel 65 will move the wheels 8 to guide the vehicle.

In order to effect adjustment of the steering mechanism to vehicles of different lengths, I prefer to divide the rod 68 and to extend the ends thereof into a tube 76 in telescoping fashion to give a desired adjustment and permit a certain amount of play due to movement of the tractor over irregular ground.

Assuming that the carrier is so constructed, in using the same, the guideway extensions are first lowered onto the ground and a propelling vehicle backed thereon onto the guideways 2—2' and into the upwardly inclined channels 30, so that the vehicle is centered on the frame and the rear axle of the vehicle moves into the standard sockets 39.

The guides 25—25' are then raised and locked in vertical position, and by so doing, the guideways 30 are moved to lower the vehicle axle into the standard socket seats and the clamp plate hooks are drawn thereover to secure the vehicle rigidly in functional position.

The chain belts are then placed over the paired sprocket wheels at opposite ends of the shaft 17 and wheel hubs and the device is ready for use to perform the work of the usual tractor.

To remove the vehicle from the carrier the latches 50 are first raised from the notches 51 so that the guideways may be lowered. Lowering of the guideways, through the links 46, rocks the bell crank levers 35 to raise the guide channels which lifts the vehicle axle from the standard sockets and raises the clamping plates so that the vehicle is free to move forwardly from the carrier.

It will be seen that by so constructing the device a tractor may be provided at small expense which will do the work of the usual tractor wherein the transmission and power mechanism is made a permanent part.

It is also apparent that by disconnecting the clutch 60 from the driving wheel gear, power may be transmitted through the shaft 17 and pulley carried thereon to drive other machines such as saws, separators, etc.

While I have shown but one drive wheel, I do not wish to limit the device to this particular form as it is apparent that, by removing the leveling wheel, a wheel similar to the wheel 9 could be mounted and also driven from the axle 17.

Having thus described my invention, what I claim as new therein, and desire to secure by Letters-Patent, is—

1. In an auto tractor, a carrier frame adapted to receive a motor vehicle thereon, upwardly inclined guideways mounted on the frame for receiving the wheels of a motor vehicle, standards mounted at opposite sides of the frame and having sockets therein, and means for lowering the inclined guideways to seat the axle of the vehicle in the standard sockets.

2. In an auto-tractor, a carrier frame, comprising parallel runways adapted to receive a motor vehicle thereon and transverse beams connecting the runways, upwardly inclined guideways mounted on the runways for receiving the wheels of a motor vehicle, standards mounted at opposite sides of the frame having sockets therein and means for lowering the inclined guideways to seat the axle of a vehicle carried thereon in the standard sockets and to free the vehicle wheels for the purpose set forth.

3. In an auto-tractor, a carrying vehicle frame comprising parallel runways adapted to receive a motor vehicle thereon, upwardly inclined guide ways pivotally mounted on the runways for receiving the wheels of a motor vehicle from the runways, standards mounted at opposite sides of the frame having forwardly opening sockets therein, guideways pivotally connected with the forward ends of the parallel runways for mounting a motor vehicle on the carrying frame and a link pivotally connecting the mounting guideways with means for lowering the inclined guideways, whereby raising of the frame will lower the inclined guideways to seat the motor vehicle axle in the standard sockets and free the vehicle wheels, for the purpose set forth.

4. In an auto-tractor, a carrying vehicle frame comprising parallel runways adapted to receive a motor vehicle thereon, upwardly inclined guideways pivotally mounted on the runways for receiving the wheels of a motor vehicle from the runways, standards mounted at opposite sides of the frame having forwardly opening sockets therein, guideways pivotally connected with the forward ends of the parallel runways for mounting a motor vehicle on the carrying frame, a link pivotally connected with the mounting guideways and with means for lowering the inclined guideways whereby raising of the former will lower the latter to seat a motor vehicle axle in the standard sockets and free the vehicle wheels, and means for connecting the driving wheels of the motor vehicle with parts of the carrying vehicle to propel the latter.

5. In an auto-tractor, a carrier frame comprising parallel runways for receiving a motor vehicle thereon, inclined guideways mounted on said parallel runways to receive the mounted vehicle wheels and for centering a vehicle on the carrier frame, standards mounted at opposite sides of the frame having forwardly opening sockets therein adapted to receive the axle of a vehicle moved along the inclined guideways to seat the axle in the standard sockets and to free the vehicle wheels, means for lowering said guideways and a clamp actuated by the means for lowering the guideways for locking said axle in said sockets.

6. In an auto-tractor, a carrier frame comprising parallel runways for receiving a motor vehicle thereon, standards mounted at opposite sides adjacent the rear end of the frame, having forwardly opening sockets therein, inclined guideways mounted on the parallel runways for receiving the wheels of a vehicle therefrom to guide the vehicle to a central position on the frame and to raise the axle of a motor vehicle into the standard sockets, locking plates mounted on the standards, guideways pivotally mounted at the forward ends of the runways for mounting a motor vehicle on the frame, means operatively connecting the mounting runways with the inclined guideways and locking plates whereby the movement of the former from and to functional position will synchronously actuate the latter parts to and from functional position for the purpose set forth.

7. In an auto tractor, a motor vehicle carrier frame, means on the frame for raising the rear axle of the motor vehicle, means for supporting the motor vehicle axle in its raised position, means for operating the first named means, and an axle locking means for the support operatively connected to the last named means.

8. In an auto tractor, a motor vehicle carrier frame, vehicle-wheel raising devices, pivoted in the frame, vehicle-supporting devices adjacent to the raising devices, axle engaging locks on the supporting devices, and means for simultaneously actuating the raising devices and the locks.

9. In an auto tractor, a motor vehicle carrier frame, vehicle wheel raising devices pivoted at their forward ends and supported on said frame axle engaging locks on said devices, and means operable from an end of the frame for simultaneously actuating the raising devices and the locks.

10. In an auto tractor, a motor vehicle carrier frame, vehicle wheel raising devices carried by said frame, axle engaging locks supported by said devices, said locks including longitudinal movable clamps and means including an elbow lever for actuating the locks simultaneously with the movement of the raising devices.

11. In an auto tractor, a carrier frame adapted to receive a motor vehicle thereon, means for raising and lowering the traction end of the vehicle relative to the frame, locking mechanism for retaining the traction end of the vehicle in functional position, and a common actuator for the raising and lowering means and the locking mechanism.

In testimony whereof I affix my signature.

GEORGE L. SCHOFIELD.